Figure 1:
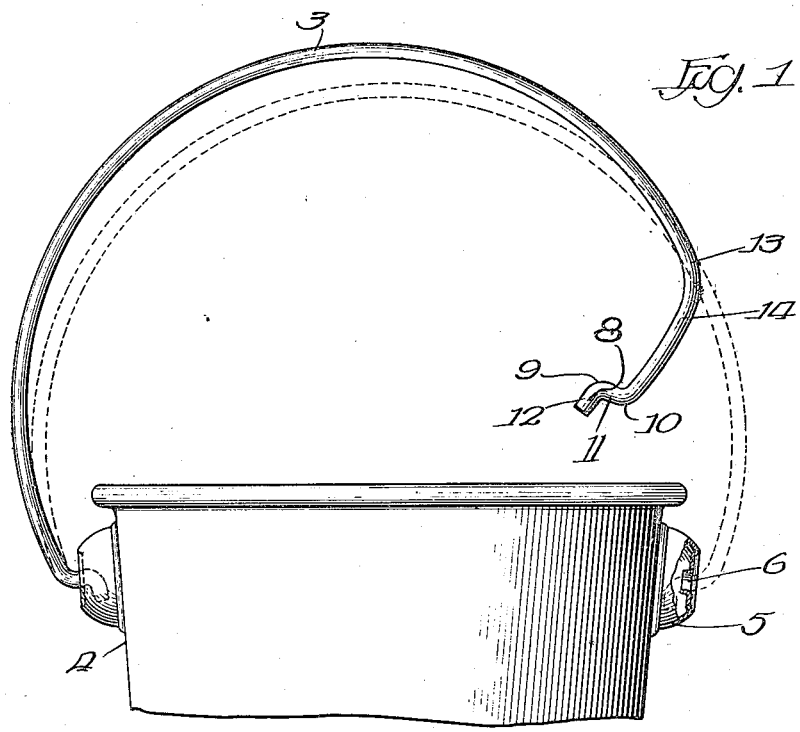

J. M. HOTHERSALL.
BUCKET BAIL.
APPLICATION FILED AUG. 16, 1915.

1,318,384. Patented Oct. 14, 1919.

Witnesses:

Inventor
John M. Hothersall

UNITED STATES PATENT OFFICE.

JOHN M. HOTHERSALL, OF BROOKLYN, NEW YORK, ASSIGNOR TO AMERICAN CAN COMPANY, OF NEW YORK, N. Y., A CORPORATION OF NEW JERSEY.

BUCKET-BAIL.

1,318,384. Specification of Letters Patent. Patented Oct. 14, 1919.

Application filed August 16, 1915. Serial No. 45,651.

*To all whom it may concern:*

Be it known that I, JOHN M. HOTHERSALL, a citizen of the United States, residing in Brooklyn, in the county of Kings and State of New York, have invented a new and useful Improvement in Bucket-Bails, of which the following is a specification.

This invention relates in general to buckets or pails and has more particular reference to the means of attaching the bail or handle thereto.

A principal object of this invention is the provision of readily engageable and permanently interlocked bail and bail ears so constructed and arranged that no weakening of the connected parts will occur in positioning the bail, and so constructed also that the engaging parts need not be operated upon after engagement.

A further object of the invention is the provision of a bail having bent or offset ends adapted for permanent interlocking engagement with bail ears, the parts of the bucket or pail being so constructed that the ends of the bail or the parts which engage the bail ears may be completely formed before the bail is secured upon the bucket.

A still further object of the invention is the provision of a pail having a pivoted bail of simple and economic construction and capable of being readily assembled.

Other objects and advantages of the invention will be apparent as it is better understood from the following description when considered in connection with the accompanying drawing illustrating a preferred embodiment thereof.

Figure 2:
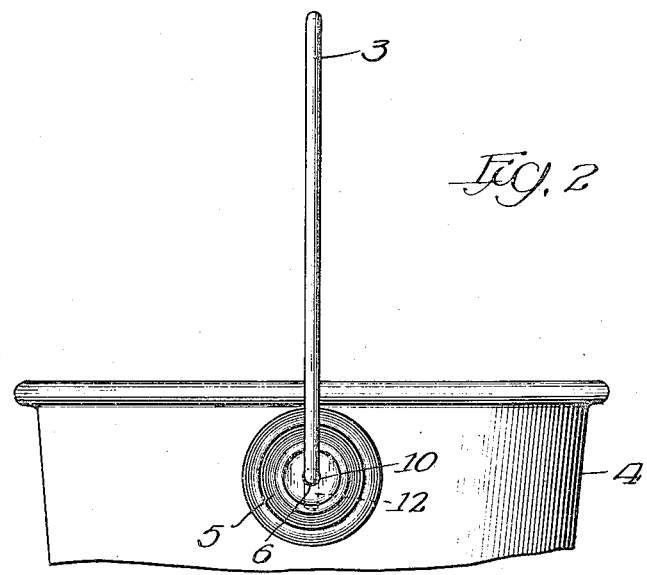

Referring to the drawing,

Figure 1 is a view of the top of a bucket or a pail provided with a bail embodying my invention; and Fig. 2 is a side view of the same.

For the purpose of illustrating my invention I have shown it embodied in a bail 3 secured upon a pail body 4 and in bail ears generally designated at 5.

The bail has two previously formed ends of identical construction. Viewing Fig. 1 it will be noted that this formation in this embodiment of the invention consists of a bend 9 and a bend 10, providing between them a substantially horizontal portion 11 and a turned down extremity 12. The horizontal portion 11 is intended to seat in the aperture 6 with the extremities 12 extending down beneath the aperture on the opposite sides of the bail ears from the body of the bail. In order that the ends 8 may be previously formed and not engaged with the bail ears, the body of the bail is given a bend 13 near one end so as to incline the extremity 12 at this end sufficiently to permit it to pass through the aperture 6 of its bail ear after the extremity 12 at the other end of the bail has passed through the aperture 6 of the other ear. Thereafter the bend 13 is removed and the end 14 of the portion of the bail between the ears brought back to the general curve of the bail, permanently locking the bail in place. This assembling is so simple that it can be readily done by hand commercially. The operation is much easier than attempting to form the ends after they have been entered into the bail ears by reason of the ready leverage available for bending the bail to its continuous and general curve.

While the invention has been described in connection with a particular formation of bail ends, it will be manifest to those skilled in the art that the invention is adapted to use in connection with bails having ends otherwise formed or adapted for insertion in ears otherwise positioned.

It is thought that the invention and many of its attendant advantages will be understood from the foregoing without further description, and it will be obvious that various changes may be made in the construction and arrangement of the parts without departing from the spirit and scope of the invention or sacrificing any of its material advantages, the form hereinbefore described being merely a preferred embodiment thereof.

I claim:

A bail for buckets and the like having near the ends thereof inward bends and within said bends supporting inward extensions, and below said extensions downwardly bent retaining portions, one of the arms of the bail having an inward bend 13 at a distance from the supporting extension, whereby the extremities of the bail are adapted to be both assembled within the bail ears already attached to the receptacle, after which the said bend 13 is straightened out to give normal shape to the said arm of the bail.

In testimony whereof I have hereunto set my hand in the presence of two subscribing witnesses.

JOHN M. HOTHERSALL.

Witnesses:
W. D. FOSTER,
ADOLPH E. J. HOERL.